United States Patent
Jung (12)

(10) Patent No.: US 6,193,251 B1
(45) Date of Patent: Feb. 27, 2001

(54) AUTOMOTIVE SUSPENSION SYSTEM HAVING A PLURALITY OF HYDRAULIC CYLINDERS

(76) Inventor: Tae Hwan Jung, 2144-4 Yeunean 6-Dong, Yeonjae-Gu, Pusan (KR)

(*) Notice: Subject to any disclaimer, the term of this patent is extended or adjusted under 35 U.S.C. 154(b) by 0 days.

(21) Appl. No.: 09/284,734

(22) PCT Filed: Feb. 11, 1999

(86) PCT No.: PCT/KR99/00070

§ 371 Date: Apr. 19, 1999

§ 102(e) Date: Apr. 19, 1999

(87) PCT Pub. No.: WO99/41095

PCT Pub. Date: Aug. 19, 1999

(30) Foreign Application Priority Data

Feb. 13, 1998 (KR) .............................................. 98-004248

(51) Int. Cl.$^7$ ................................................... B60G 15/08
(52) U.S. Cl. ................................... 280/124.146; 267/223; 280/124.1; 280/124.134; 280/124.154; 280/124.157
(58) Field of Search ......................... 280/124.1, 124.125, 280/124.134, 124.135, 124.145, 124.146, 124.151, 124.154, 124.157, 124.16, 124.161, 124.162, FOR 123, FOR 150, FOR 159, FOR 166, FOR 167; 267/34, 222, 223

(56) References Cited

U.S. PATENT DOCUMENTS 4,960,291   10/1990   Lin .

FOREIGN PATENT DOCUMENTS

| 3835225 | 4/1990 | (DE) . |
| 3909942 | 9/1990 | (DE) . |
| 4002059 | 1/1991 | (DE) . |
| 0029289 | 5/1981 | (EP) . |

*Primary Examiner*—Eric Culbreth
(74) *Attorney, Agent, or Firm*—Birch, Stewart, Kolasch & Birch, LLP

(57) ABSTRACT

An improved automotive suspension system is provided which is capable of moving the center of a junction thereof in accordance with shock and swing applied to an automotive frame. The improved automotive suspension system exert both shock absorption and anti-swing functions against slight external shock and swing by the resultant forces between the components connected to the center of the junction, to thereby facilitate the running and turning of a vehicle in a stable manner. The automotive suspension system has a new mechanical structure which operates against a slight shock or swing, by using a plurality of hydraulic cylinders and a rigid suspension rod in a conventional MacPherson strut type suspension system. 16 maintains the distance between the automotive frame and the control arm of the wheel at a constant height, upon the generation of a slight shock or swing against the automotive frame, and includes an additional shock absorber with shock absorption and anti-swing functions in addition to including an existing shock absorber contained in the conventional MacPherson strut type suspension system, when an external shock is applied to an automotive frame, to thereby facilitating the running and turning of a vehicle in a stable manner.

1 Claim, 4 Drawing Sheets

AUTOMOTIVE SUSPENSION SYSTEM HAVING A PLURALITY OF HYDRAULIC CYLINDERS

This application is the national phase under 35 U.S.C. §371 of PCT International Applcation No. PCT/KR99/00070 which has an International filing date of Feb. 11, 1999, which designated the United States of America.

TECHNICAL FIELD

The present invention relates to an automotive suspension system, and more particularly, to an improved automotive suspension system which is capable of moving the center of the junction thereof upon the application of shock and swing to an automotive frame. In addition, the present invention is directed to an automotive suspension system which can exert both shock absorption and anti-swing functions against slight external shock and swing by the resultant forces between the components connected to the center of junction thereof, thereby facilitating the running and turning of a vehicle in a stable manner.

BACKGROUND ART

A conventional automotive suspension system is disclosed in U.S. Pat. No. 4,960,291, which is based upon a conventional MacPherson strut type suspension system and is provided with two shock absorbing hydraulic cylinders, each having different inner piston diameters. The suspension system operates to absorb shock and provide anti-swing protection against the application of shock or swing on an automotive frame, by using a hydraulic fluid piping system and a sensing device. However, it has been noted that since the conventional suspension system includes a hydraulic fluid piping system, a hydraulic controller and a sensing device which are manufactured in a complicated manner, there frequently occurs some problems in that unexpected failures of the components are experienced. The repair of these components is not easy to achieve and the cost of maintenance is very high. FIG. 1 is a perspective view of a conventional MacPherson strut type suspension system, which is widely used in a vehicle. To improve the stability of the running of the vehicle, however, there is a need to develop a novel automotive suspension system which is structured with complete shock absorption and anti-swing functions in order to remove the restrictions on the mechanical structure of the conventional suspension system.

To this end, in the preferred embodiment of the present invention, there is provided an improved automotive suspension system which is designed with the combination of a plurality of hydraulic cylinders with a rigid suspension rod in a predetermined manner in the conventional MacPherson strut type suspension system, for improving the shock absorption and anti-swing efficiencies. For example, if a slight shock or swing is applied to a vehicle, the conventional MacPherson strut type suspension system is not responsive to such an applied shock or swinging means. However, the automotive suspension system according to the present invention can be readily responsive thereto. Also, if a heavy shock or swing is applied to a vehicle, the automotive suspension system according to the present invention includes an additional shock absorber as well as the existing shock absorber for responding to such a shock or swing.

Therefore, the present invention is directed to an automotive suspension system which has the functions of absorbing the shocks applied due to the continuous irregularities of the surface of the road and eliminating the swing generated by the centrifugal force produced during the turning of a vehicle.

DISCLOSURE OF INVENTION

An object of the present invention is to provide an improved automotive suspension system which is designed with a new mechanical structure which operates against a slight shock or swing, by using a plurality of hydraulic cylinders and a rigid suspension rod in a conventional MacPherson strut type suspension system.

Another object of the present invention is to provide an improved automotive suspension system which can maintain the distance between an automotive frame and the axle of a wheel each connected thereto at a constant height, upon the generation of a slight shock or swing against the automotive frame.

Still another object of the present invention is to provide an improved automotive suspension system which comprises an additional shock absorber with shock absorption and anti-swing functions which are used in addition to the an existing shock absorber contained in a conventional MacPherson strut type suspension system thus, when an external shock is applied to an automotive frame, the running and turning of a vehicle in a stable manner is facilitated.

To achieve these and other objects according to the present invention, an automotive suspension system is provided which is rotatably connected between the wheel axle and an automotive frame. The automotive compressor system comprises a first hydraulic cylinder having a relative small inner diameter and attached, in a length direction, to be integrated with an improved MacPherson strut type shock absorber, made by shortening the length of an existing MacPherson strut type shock absorber and reinforcing the compression force of the spring thereof. A bottom end portion of a first hydraulic cylinder is combined with a top end portion of a second hydraulic cylinder, having a relative larger inner diameter than the first hydraulic cylinder, and a bottom end portion of a rigid suspension rod, respectively, at appropriately defined combining angles. The combined elements are rotatably connected to each other, the second hydraulic cylinder having a bottom end portion connected with the axle of a wheel, and the suspension rod having a top end portion connected with the automotive frame. The improved MacPherson strut type shock absorber has a top end portion connected with the automotive frame, the top end portion of the suspension rod being installed to be disposed higher than the horizontal position of the center junction of the combined portions and attached toward the inward direction of the automotive frame. The improved MacPherson strut type shock absorber being is adapted to be attached between the first and second spring fixing boards to allow a first coil spring to be inserted thereinto and separated. The first hydraulic cylinder is adapted to be attached between the second spring fixing board and a third spring fixing board to allow a second coil spring having a relative smaller compression force than the first coil spring to be inserted separated. A thereinto and therefrom; a flexible hydraulic hose is provided for connecting the first and second hydraulic cylinders to move oil pressure toward each other. First and second oil inlet holes, respectively, are formed on the external surfaces of the first and second hydraulic cylinders, each oil inlet hole having a locking device thereon. At least two or more supporting members for rotation prevention respectively are attached to the external surface of the second hydraulic cylinder for use upon the application of heavy a strong shock or swing to the automotive frame.

BRIEF DESCRIPTION OF DRAWINGS

These and other advantages, features and objects of the present invention will become apparent from the following detailed description of the preferred embodiment of the present invention with reference to the accompanying drawings, in which.

BEST MODE FOR CARRYING OUT THE INVENTION

In the preferred embodiment of the present invention, an improved automotive suspension system is designed with a new mechanical structure where first and second hydraulic cylinders each having different inner diameters from each other are associated with a rigid suspension rod at appropriately combined angles in the conventional MacPherson strut type suspension system. Now, an explanation of the construction and operation of the automotive suspension system according to the present invention will be discussed in detail with reference to FIGS. 2 to 4.

Figure 1:
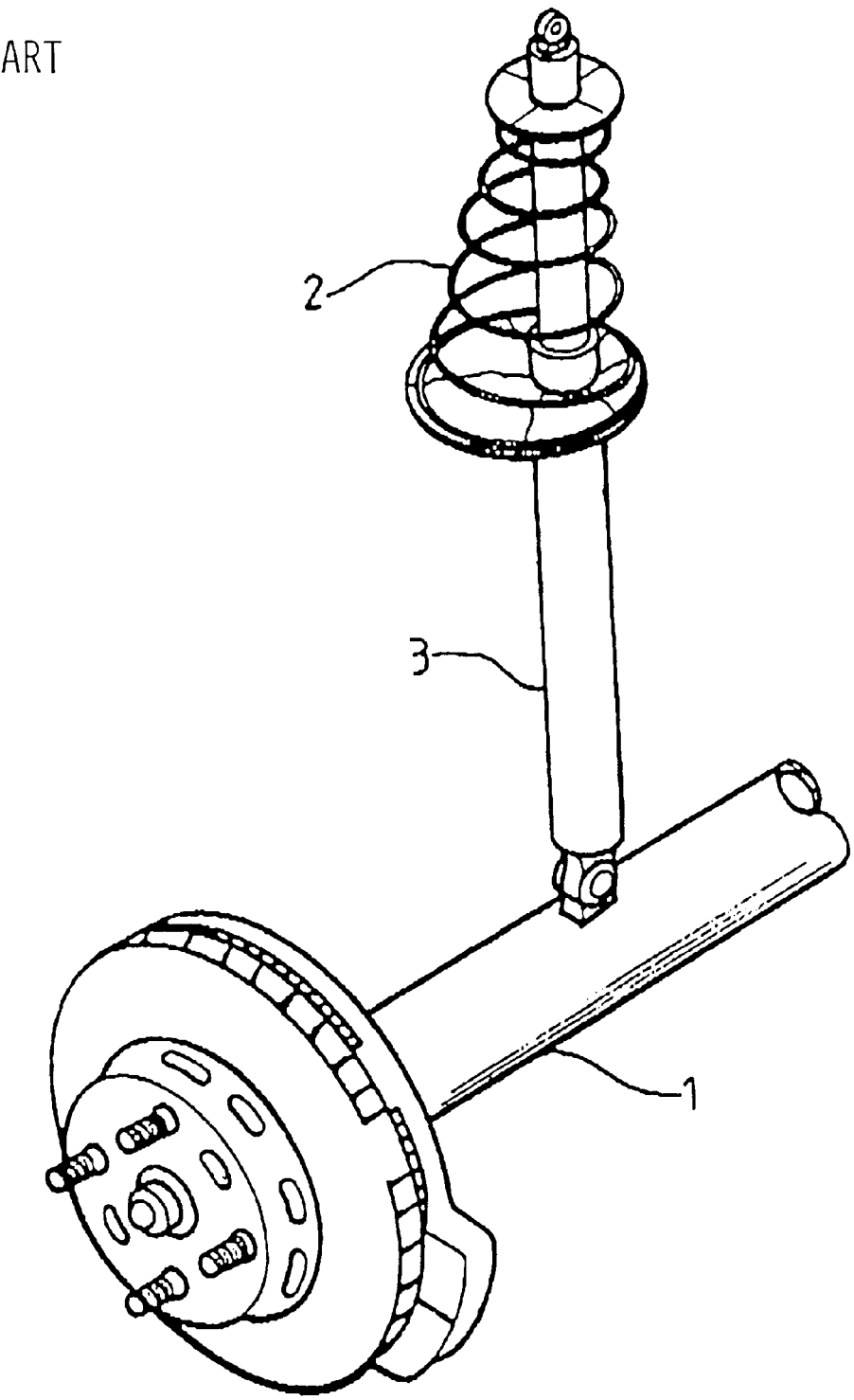
FIG. 1 is a perspective view of a conventional MacPherson strut type suspension system.
Figure 2:
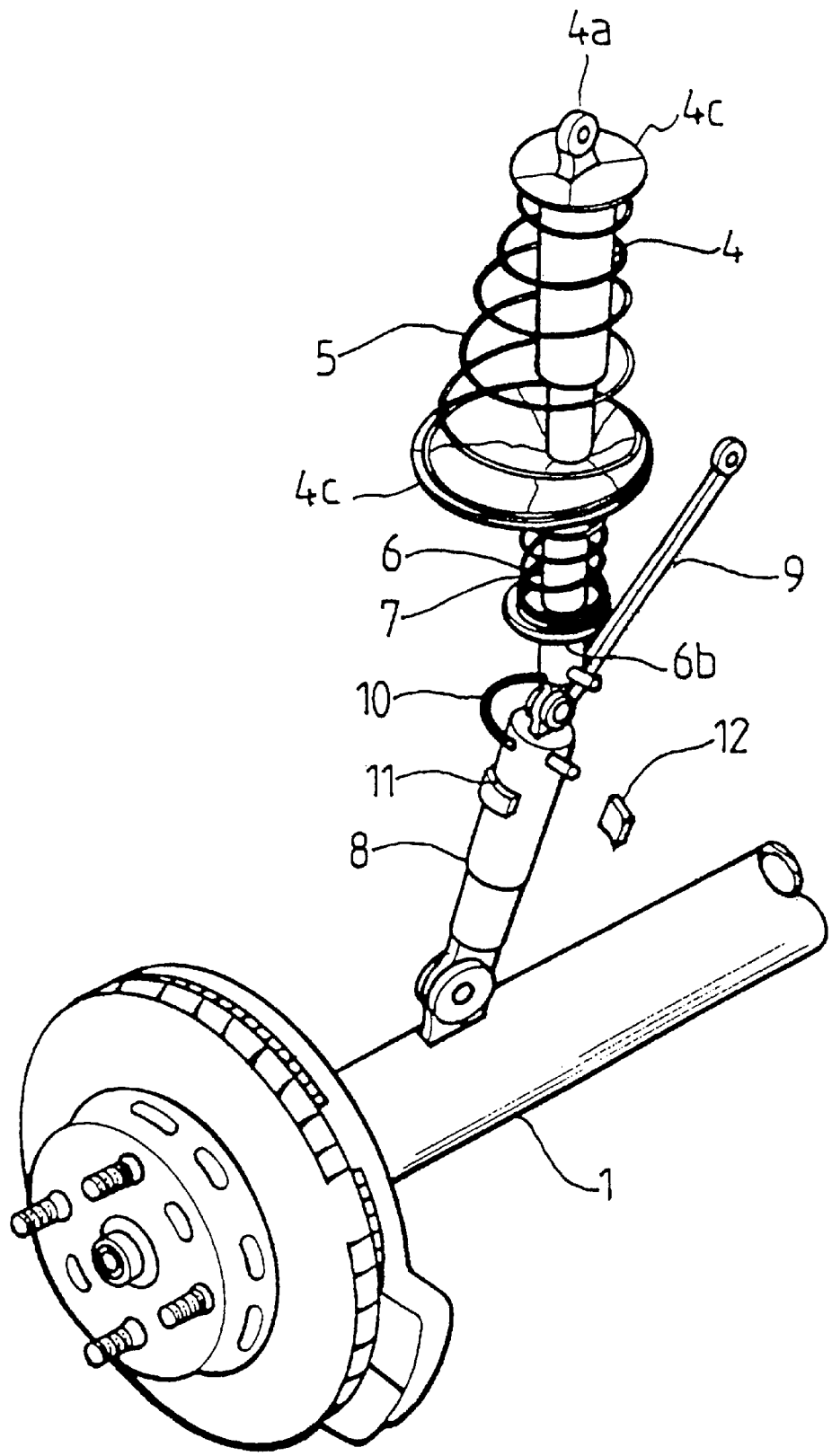
FIG. 2 is a perspective view of an automotive suspension system according to the present invention, which is installed to be connected with the control arm of wheel.
Figure 3:
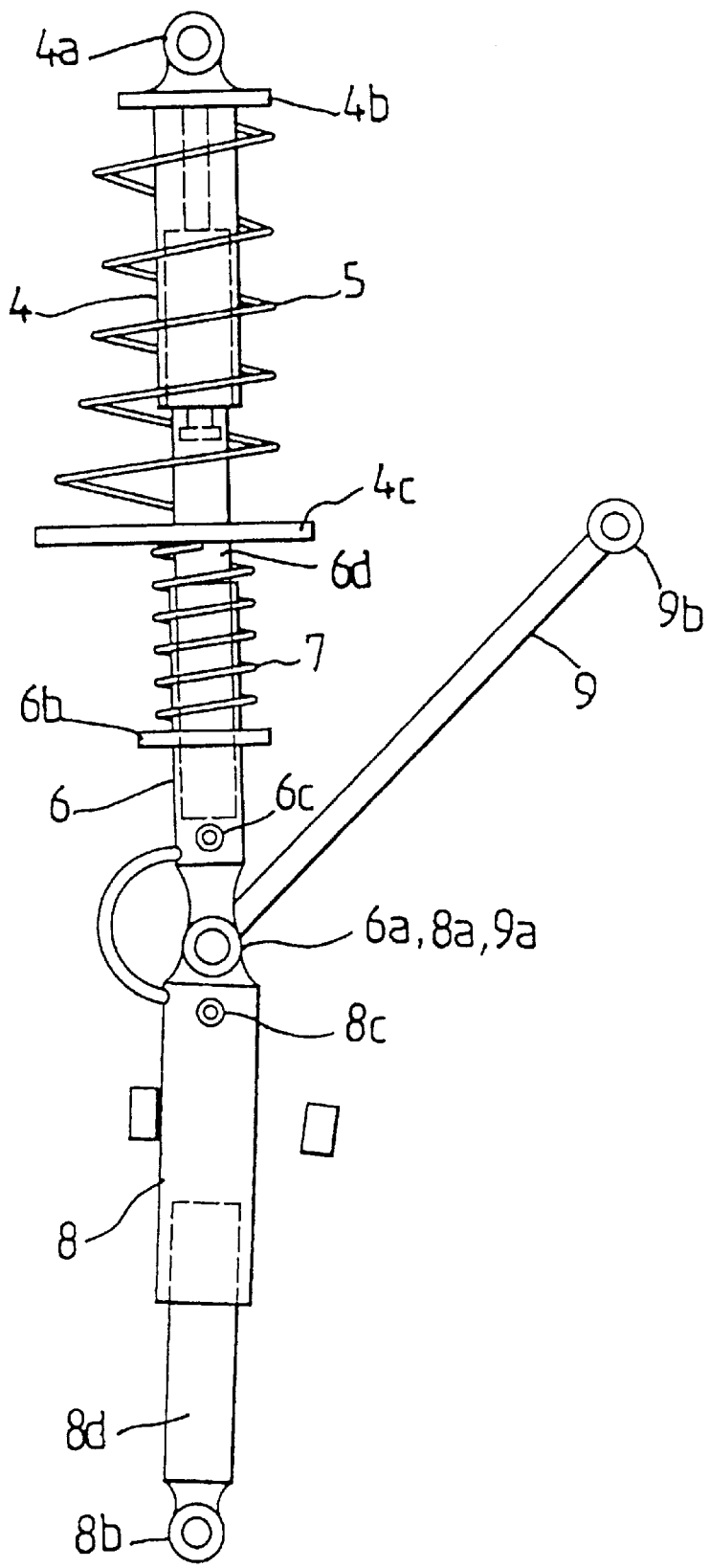
FIG. 3 is a top view of an automotive suspension system according to the present invention, when no shock or swing is generated against an automotive frame.

As shown in FIG. 2, in construction, a first hydraulic cylinder 6 which has a relative small inner diameter is attached, in a length direction, to be integrated with an improved MacPherson strut type shock absorber 4, which is made by shortening the length of an existing MacPherson strut type shock absorber 3 (see FIG. 1) and reinforcing the compression force of a spring 5. The bottom end portion 6a of the first hydraulic cylinder 6 is combined with the top end portion 8a of a second hydraulic cylinder 8 having a relatively larger inner diameter than the first hydraulic cylinder 6 and the bottom end portion 9a of a rigid suspension rod 9(hereinafter, referred to as "suspension rod") at appropriately combining angles as shown in FIG. 3, in such a manner that the combined portions 6a, 8a and 9a are rotatably connected to each other.

The automotive suspension system according to the present invention is disposed between the axle 1 of a wheel and an automotive frame. Axle 1 of the wheel is connected with the bottom end portion 8b of the second hydraulic cylinder 8, and the automotive frame is combined with the top end portion 9b of the suspension rod 9 and the top end portion 4a of the improved MacPherson strut type shock absorber 4. Preferably, the top end portion 9b of the suspension rod 9, which is installed to be higher than the horizontal position of the center of junction of the combined portions 6a, 8a and 9a, is attached toward the inward direction of the automotive frame. The improved MacPherson strut type shock absorber 4 is adapted to be attached between spring fixing boards 4b and 4c to allow a coil spring 5 to be inserted thereinto and separated therefrom. In addition, the first hydraulic cylinder 6 is adapted to be attached between the spring fixing board 4c and a spring fixing board 6b to allow a coil spring 7, having a relative smaller compression force than the coil spring 5, to be inserted thereinto and separated therefrom.

The first and second hydraulic cylinders 6 and 8 are connected to move oil pressure toward each other by means of a flexible hydraulic hose 10. As shown in FIG. 3, first and second oil inlet holes 6c and 8c, each which has a locking device thereon, are respectively formed on the external surfaces of the first and second hydraulic cylinders 6 and 8. In addition, as shown in FIG. 2, two supporting members 11 and 12 which are provided for rotation prevention are operatively associated with the external surface of the second hydraulic cylinder 8, upon the application of the heavy shock or swing to the automotive frame.

Figure 4:
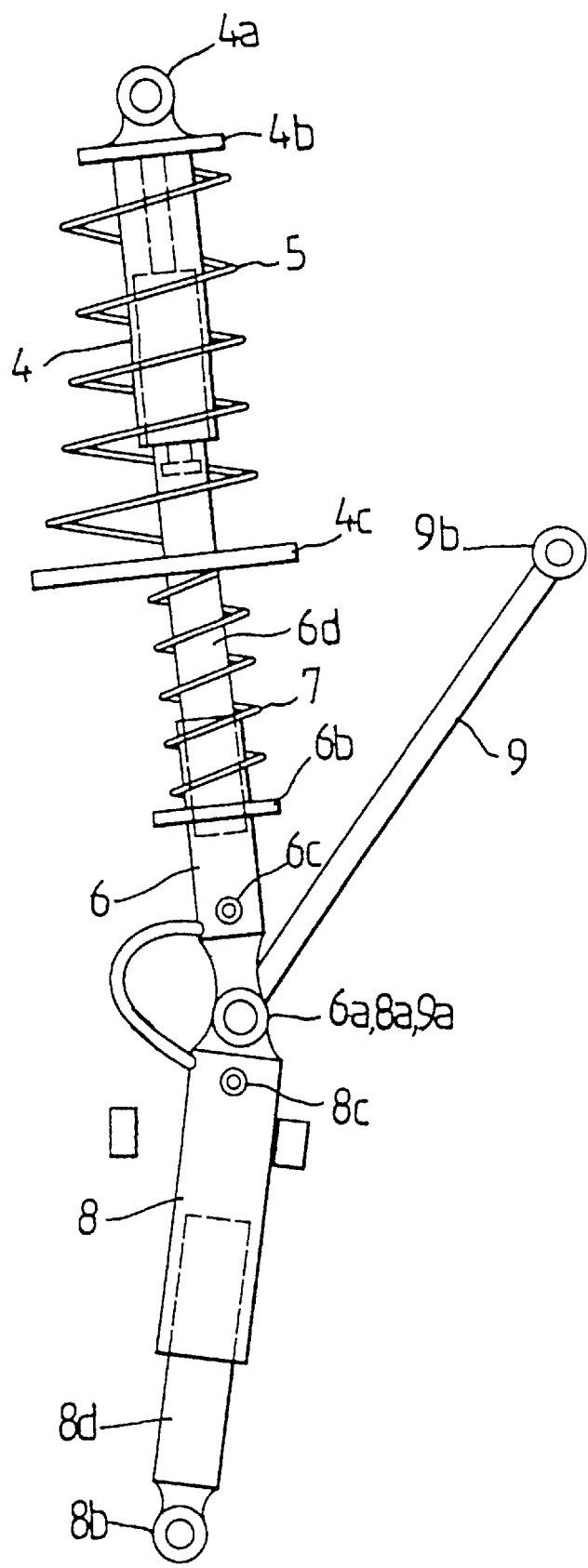
FIG. 4 is a top view of an automotive suspension system according to the present invention, when shock or swing is generated against the automotive frame.

Firstly, an explanation of the principles of the construction of the automotive suspension frame according to the present invention, which is designed with a new mechanical structure responding to a slight external shock or swing, will be given hereinafter. As shown in FIGS. 3 and 4, the end portions 6a and 8a of the first and second hydraulic cylinders 6 and 8 and the end portion 9a of the suspension rod 9 are combined to perform an arc motion, upon the application of a slight external shock or swing, in the radius of the suspension rod 9. The tension forces of the supporting rod 9 and the oil pressure force of the first and second hydraulic cylinders 6 and 8 each existing at the center of junction of the combined portions 6a, 8a and 9a are movable, such that the center of junction of the combined portions can perform the arc motion against a slight shock or swing. Moreover, the coil spring 7 having a relatively smaller compression force is attached on the first hydraulic cylinder 6, such that the first hydraulic cylinder 6 having a relatively smaller inner diameter can be smoothly expanded against a slight shock or swing.

Secondly, an explanation of the principles of the construction of the automotive suspension frame according to the present invention will be given for maintaining the distance between the automotive frame and the axle 1 of the wheel, each connected thereto in a constant height when a slight shock or swing(not enough to operate the coil spring having the relative larger compression force) is generated against the automotive frame. As noted, the automotive suspension frame according to the present invention maintains the distance between the automotive frame and the axle 1 of the wheel in a constant height. Upon the application of slight shock or swing on the present suspension system, the first hydraulic cylinder 6 moves the center of junction of the combined portions 6a, 8a, and 9a in the bottom end direction thereof and is simultaneously expanded, and contrarily, the second hydraulic cylinder 8 is made to contract, such that the distance between the automotive frame and the axle 1 of the wheel can be maintained at a constant height. In other words, while the internal angle between the suspension rod 9 and the first and second hydraulic cylinders 6 and 8 are varied in accordance with the shock or load applied to the automotive frame, the center of junction of the combined portions 6a, 8a and 9a performs the arc motion centering around the top end portion 9b of the suspension rod 9. When the suspension system according to the present invention is returned to the state prior to the application of shock or swing, the reverse process is executed. In short, the first and second hydraulic cylinders 6 and 8, which are operated at a constant angle, are expanded and/or contracted to perform the arc motion of the center of junction of the combined portions, such that the distance between the automotive frame and the axle 1 of the wheel can be maintained at constant height. In other words, the suspension system according to the present invention can maintain the distance between the automotive frame and the axle 1 of the wheel at a constant height and separated from the surface of the earth, when a slight shock or swing, not enough to compress the coil spring 5 attached to the improved MacPherson strut type shock absorber 4 is applied.

Since, the additional shock absorber is provided for a heavy shock or swing, enough to compress the coil spring 5 which has a stronger compression force than the coil spring 7, each of the first and second hydraulic cylinders 6 and 8 and the suspension rod 9 functions to dampen the applied shock or swing. At this time, the height of the automotive suspension system according to the present invention is reduced in proportion to that of the compressed coil spring, and the amount of the shock or swing primarily absorbed on the coil spring causes the automotive frame to vibrate due to bouncing, pitching, rolling and the like. To rapidly attenuate the various types of vibration of the automotive frame, each of the first and second hydraulic cylinders 6 and 8 and the suspension rod 9 functions as an additional shock absorber.

The first and second hydraulic cylinders 6 and 8 are repeatedly expanded and/or contracted in accordance with the vibration of the coil spring, and thus the movement of the oil pressure, having a large viscosity, between the two hydraulic cylinders allows the vibrating coil spring 5 to be damped, to thereby attenuate the vibration of the coil spring 5 at a rapid speed. On the other hand, the suspension rod 9, which performs the arc movement upward and downward in accordance with the vibration of the coil spring, functions as a rod damper for distributing and attenuating, at a rapid speed, the vibration of the coil spring into the interior thereof, to thereby return to an initial state prior to the application of the shock or swing on the automotive suspension system.

INDUSTRIAL APPLICABILITY

As apparent from the foregoing, the automotive suspension system of the present invention is designed to an improved mechanical structure in which both shock absorption and anti-swing functions against slight shock and swing are provided and first and second hydraulic cylinders and a suspension rod are utilized as additional shock absorbers. The automotive suspension system of the present invention has the following advantages: Firstly, the grounding force of tires during the running and turning of a vehicle is improved, thus shortening the braking distance. Secondly, a low degree of vibration is realized, thus ensuring a stable running of the vehicle. Thirdly, the operational structure is simplified, thus accomplishing easy maintenance. Finally, the cost of production is low and the efficiency obtained therefrom is excellent, thus overcoming the problems to be solved in the conventional automotive suspension systems. Moreover, an additional system which adopts the mechanical structure as mentioned above may be developed, and the possibility of industrial applicability of the present invention is not restricted.

What is claimed is:

1. An automotive suspension system which is rotatably connected between one portion of a wheel axle and two portions of an automotive frame, comprising;

a first hydraulic cylinder having a small inner diameter and integrated with a strut-type shock absorber, said absorber made by shortening the length of an existing strut type shock absorber and reinforcing the compression force with a spring, a bottom end portion of said first hydraulic cylinder being combined with a top end portion of a second hydraulic cylinder having a larger inner diameter than said first hydraulic cylinder, and a bottom end portion of a rigid suspension rod, respectively, at appropriate combining angles, in such a manner that the combined portions thereof are rotatably connected to each other;

said second hydraulic cylinder having a bottom end portion connected with the wheel axle, and said suspension rod having a top end portion connected with said automotive frame, and said strut type shock absorber having a top end portion connected with said automotive frame, said top end portion of said suspension rod installed to be disposed higher than the horizontal position of a center of junction of the combined portions and attached toward an inward direction of said automotive frame;

said strut type shock absorber being attached between first and second spring fixing boards to allow a first coil spring to be inserted thereinto and separated therefrom, and said first hydraulic cylinder being adapted to be attached between said second spring fixing board and a third spring fixing board to allow a second coil spring having a relative smaller compression force than said first coil spring to be inserted thereinto and separated therefrom; and a flexible hydraulic hose for connecting said first and second hydraulic cylinders to move oil pressure toward each other and having first and second oil inlet holes respectively formed on the external surfaces of said first and second hydraulic cylinders, each oil inlet hole having a locking device thereon.

\* \* \* \* \*